US009521131B2

(12) United States Patent
Shewchuk et al.

(10) Patent No.: US 9,521,131 B2
(45) Date of Patent: *Dec. 13, 2016

(54) REMOTE ACCESS OF DIGITAL IDENTITIES

(71) Applicant: Microsoft Technology Licensing, LLC, Redmond, WA (US)

(72) Inventors: John Shewchuk, Redmond, WA (US); Kim Cameron, Bellevue, WA (US); Arun Nanda, Sammamish, WA (US); Xiao Xie, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,782

(22) Filed: Feb. 10, 2014

(65) Prior Publication Data

US 2014/0215577 A1 Jul. 31, 2014

Related U.S. Application Data

(63) Continuation of application No. 11/952,890, filed on Dec. 7, 2007, now Pat. No. 8,689,296.

(Continued)

(51) Int. Cl.
*H04L 29/06* (2006.01)
*G06F 21/33* (2013.01)
*G06F 21/41* (2013.01)

(52) U.S. Cl.
CPC ............. *H04L 63/08* (2013.01); *G06F 21/33* (2013.01); *G06F 21/41* (2013.01)

(58) Field of Classification Search
USPC ............. 726/2–7, 9; 713/170, 173, 178
See application file for complete search history.

(56) References Cited

U.S. PATENT DOCUMENTS 5,442,704 A 8/1995 Holtey
5,657,388 A 8/1997 Weiss
(Continued)

FOREIGN PATENT DOCUMENTS

CN 1456983 A 11/2003
CN 1589446 A 3/2005
(Continued)

OTHER PUBLICATIONS

"Strong Authentication on Mobile Devices Leveraging the OATH Open Framework" [online], Diversinet, May 10, 2005, 18 pgs., http://conference.digitalidworld.com/2005/attendees/slides/Sea_C_0510_1330a.pdf.

(Continued)

*Primary Examiner* — Beemnet Dada
(74) *Attorney, Agent, or Firm* — Kate Drakos; Aneesh Mehta; Micky Minhas

(57) ABSTRACT

A system and method for controlling distribution and use of digital identity representations ("DIRs") increases security, usability, and oversight of DIR use. A DIR stored on a first device may be obtained by a second device for use in satisfying the security policy of a relying party. Release of the DIR to the second device requires permission from a device or entity that may be different from the device or entity attempting to access the relying party. Further, the use of the DIR to obtain an identity token may separately require permission of even a different person or entity and may be conditioned upon receiving satisfactory information relating to the intended use of the DIR (e.g., the name of the relying party, type of operation being attempted, etc.). By controlling the distribution and use of DIRs, security of the principal's identity and supervisory control over a principal's activities are enhanced.

20 Claims, 7 Drawing Sheets

Related U.S. Application Data

(60) Provisional application No. 60/886,894, filed on Jan. 26, 2007.

(56) References Cited

U.S. PATENT DOCUMENTS

| | | |
|---|---|---|
| 5,659,616 A | 8/1997 | Sudia |
| 5,678,015 A | 10/1997 | Goh |
| 5,887,131 A | 3/1999 | Angelo |
| 5,907,838 A | 5/1999 | Miyasaka et al. |
| 5,995,625 A | 11/1999 | Sudia et al. |
| 6,005,939 A | 12/1999 | Fortenberry |
| 6,016,476 A | 1/2000 | Maes et al. |
| 6,161,125 A | 12/2000 | Traversat |
| 6,202,151 B1 | 3/2001 | Musgrave et al. |
| 6,442,532 B1 | 8/2002 | Kawan |
| 6,526,434 B1 | 2/2003 | Carlson et al. |
| 6,553,494 B1 | 4/2003 | Glass |
| 6,754,829 B1 | 6/2004 | Butt et al. |
| 6,785,810 B1 | 8/2004 | Lirov |
| 6,791,583 B2 | 9/2004 | Tang et al. |
| 6,802,002 B1 | 10/2004 | Corella |
| 6,810,480 B1 | 10/2004 | Parker |
| 6,817,521 B1 | 11/2004 | Matada |
| 6,836,765 B1 | 12/2004 | Sussman |
| 6,839,690 B1 | 1/2005 | Foth et al. |
| 6,856,963 B1 | 2/2005 | Hurwitz |
| 6,879,769 B1 | 4/2005 | Kawai |
| 6,934,841 B2 | 8/2005 | Boyles |
| 6,934,913 B2 | 8/2005 | Le |
| 6,955,295 B2 | 10/2005 | Hosogoe |
| 6,957,338 B1 | 10/2005 | Sumino |
| 6,961,857 B1 | 11/2005 | Floryanzia |
| 6,981,043 B2 | 12/2005 | Botz et al. |
| 6,993,659 B2 | 1/2006 | Milgramm |
| 7,000,108 B1 | 2/2006 | Yarsa et al. |
| 7,003,495 B1 | 2/2006 | Burger et al. |
| 7,007,298 B1 | 2/2006 | Shinzaki |
| 7,020,474 B2 | 3/2006 | Scott |
| 7,020,778 B1 | 3/2006 | Miettinen |
| 7,047,418 B1 | 5/2006 | Ferren |
| 7,069,447 B1 | 6/2006 | Corder |
| 7,083,095 B2 | 8/2006 | Hendrick |
| 7,103,773 B2 | 9/2006 | Erickson |
| 7,131,583 B2 | 11/2006 | Jaros et al. |
| 7,146,159 B1 | 12/2006 | Zhu |
| 7,162,475 B2 | 1/2007 | Ackerman |
| 7,162,581 B2 | 1/2007 | Newman et al. |
| 7,206,432 B2 | 4/2007 | Iwamura |
| 7,231,371 B1 | 6/2007 | Cantini et al. |
| 7,266,705 B2 | 9/2007 | Peck et al. |
| 7,356,837 B2 * | 4/2008 | Asghari-Kamrani et al. .... 726/5 |
| 7,409,543 B1 | 8/2008 | Bjorn |
| 7,424,457 B2 | 9/2008 | Khaishgi et al. |
| 7,451,921 B2 | 11/2008 | Dowling et al. |
| 7,475,429 B2 | 1/2009 | Carro |
| 7,680,819 B1 | 3/2010 | Mellmer |
| 7,788,499 B2 | 8/2010 | Cameron et al. |
| 8,078,880 B2 | 12/2011 | Nanda et al. |
| 8,087,072 B2 | 12/2011 | Gajjala et al. |
| 8,104,074 B2 | 1/2012 | Cameron et al. |
| 8,117,459 B2 | 2/2012 | Cameron et al. |
| 8,407,767 B2 | 3/2013 | Gajjala et al. |
| 2001/0034746 A1 | 10/2001 | Tsakiri |
| 2001/0054148 A1 | 12/2001 | Hoorneart |
| 2002/0010862 A1 | 1/2002 | Ebara |
| 2002/0026397 A1 | 2/2002 | Ieta et al. |
| 2002/0046041 A1 | 4/2002 | Lang |
| 2002/0103801 A1 | 8/2002 | Lyons |
| 2002/0124115 A1 | 9/2002 | McLean |
| 2002/0133535 A1 | 9/2002 | Lucovsky |
| 2002/0175916 A1 | 11/2002 | Nichols |
| 2002/0184508 A1 | 12/2002 | Bialick et al. |
| 2002/0194139 A1 | 12/2002 | Kianian |
| 2003/0005305 A1 | 1/2003 | Brickell |
| 2003/0018585 A1 | 1/2003 | Butler et al. |
| 2003/0046575 A1 | 3/2003 | Bhogal |
| 2003/0046591 A1 | 3/2003 | Asghari-Kamrani |
| 2003/0048904 A1 | 3/2003 | Wang et al. |
| 2003/0074660 A1 | 4/2003 | McCormack |
| 2003/0093681 A1 | 5/2003 | Wettstein |
| 2003/0135500 A1 | 7/2003 | Chevrel et al. |
| 2003/0149781 A1 * | 8/2003 | Yared et al. .................. 709/229 |
| 2003/0172090 A1 | 9/2003 | Asumnaa |
| 2003/0177356 A1 | 9/2003 | Abela |
| 2003/0182421 A1 | 9/2003 | Faybishenko |
| 2003/0188019 A1 | 10/2003 | Wesley |
| 2003/0200175 A1 | 10/2003 | Wang |
| 2003/0200217 A1 | 10/2003 | Ackerman |
| 2003/0216136 A1 | 11/2003 | McBreaty et al. |
| 2003/0229783 A1 | 12/2003 | Hardt |
| 2003/0233580 A1 | 12/2003 | Keeler et al. |
| 2004/0010720 A1 | 1/2004 | Singh |
| 2004/0054913 A1 | 3/2004 | West |
| 2004/0064708 A1 | 4/2004 | Angelo et al. |
| 2004/0103040 A1 | 5/2004 | Ronaghi |
| 2004/0103324 A1 | 5/2004 | Band |
| 2004/0111520 A1 | 6/2004 | Krantz |
| 2004/0114571 A1 | 6/2004 | Timmins |
| 2004/0122926 A1 | 6/2004 | Moore et al. |
| 2004/0162786 A1 | 8/2004 | Cross et al. |
| 2004/0205243 A1 * | 10/2004 | Hurvig et al. ................. 709/245 |
| 2004/0230831 A1 | 11/2004 | Spelman |
| 2004/0250084 A1 | 12/2004 | Hamid |
| 2005/0044423 A1 | 2/2005 | Mellmer et al. |
| 2005/0050363 A1 | 3/2005 | Naka et al. |
| 2005/0059494 A1 | 3/2005 | Kammler |
| 2005/0065810 A1 | 3/2005 | Bouron |
| 2005/0071687 A1 | 3/2005 | Pathakis et al. |
| 2005/0074028 A1 | 4/2005 | Wugofski |
| 2005/0091264 A1 | 4/2005 | Cameron et al. |
| 2005/0091290 A1 | 4/2005 | Cameron et al. |
| 2005/0091492 A1 | 4/2005 | Benson |
| 2005/0091495 A1 | 4/2005 | Cameron et al. |
| 2005/0108575 A1 | 5/2005 | Yung |
| 2005/0114447 A1 | 5/2005 | Cameron et al. |
| 2005/0122926 A1 | 6/2005 | Cromer |
| 2005/0124320 A1 | 6/2005 | Ernst |
| 2005/0125677 A1 | 6/2005 | Michaelides |
| 2005/0125678 A1 | 6/2005 | Shaw |
| 2005/0149383 A1 | 7/2005 | Zacharia |
| 2005/0152544 A1 | 7/2005 | Kizawa |
| 2005/0171872 A1 | 8/2005 | Burch et al. |
| 2005/0172229 A1 | 8/2005 | Remo et al. |
| 2005/0182741 A1 | 8/2005 | Grossman |
| 2005/0183566 A1 | 8/2005 | Nash |
| 2005/0198322 A1 | 9/2005 | Takabayashi et al. |
| 2005/0216405 A1 | 9/2005 | So et al. |
| 2005/0278547 A1 | 12/2005 | Hyndman et al. |
| 2005/0283443 A1 | 12/2005 | Hardt |
| 2006/0005020 A1 | 1/2006 | Hardt |
| 2006/0005263 A1 | 1/2006 | Hardt |
| 2006/0010007 A1 | 1/2006 | Denman |
| 2006/0043164 A1 | 3/2006 | Dowling et al. |
| 2006/0053296 A1 * | 3/2006 | Busboom et al. ............ 713/182 |
| 2006/0080702 A1 | 4/2006 | Diez et al. |
| 2006/0104486 A1 | 5/2006 | Le Saint |
| 2006/0129509 A1 | 6/2006 | Gaines |
| 2006/0165060 A1 | 7/2006 | Dua |
| 2006/0174323 A1 | 8/2006 | Brown et al. |
| 2006/0174350 A1 | 8/2006 | Roever |
| 2006/0179481 A1 | 8/2006 | D'Agnolo |
| 2006/0200866 A1 | 9/2006 | Cameron et al. |
| 2006/0206723 A1 | 9/2006 | Gil |
| 2006/0206724 A1 | 9/2006 | Schaufele |
| 2006/0224611 A1 | 10/2006 | Dunn |
| 2006/0235795 A1 | 10/2006 | Johnson et al. |
| 2006/0248598 A1 | 11/2006 | Johnson et al. |
| 2006/0253582 A1 | 11/2006 | Dixon et al. |
| 2006/0277595 A1 | 12/2006 | Kinser et al. |
| 2006/0282670 A1 | 12/2006 | Karchov |
| 2007/0011100 A1 | 1/2007 | Libin et al. |
| 2007/0124269 A1 | 5/2007 | Rutter et al. |
| 2007/0124596 A1 | 5/2007 | Chevrel et al. |
| 2007/0194884 A1 | 8/2007 | Didier et al. |

(56) References Cited

U.S. PATENT DOCUMENTS

| | | |
|---|---|---|
| 2007/0203852 A1 | 8/2007 | Cameron |
| 2007/0300183 A1 | 12/2007 | Anttila et al. |
| 2008/0034412 A1 | 2/2008 | Wahl |
| 2008/0103972 A1 | 5/2008 | Lanc |
| 2008/0104142 A1 | 5/2008 | Oh et al. |
| 2008/0178272 A1 | 7/2008 | Gajjala et al. |
| 2008/0184339 A1 | 7/2008 | Shewchuk |
| 2008/0196096 A1 | 8/2008 | Grynberg |
| 2008/0229383 A1 | 9/2008 | Buss et al. |
| 2008/0229410 A1 | 9/2008 | Felsted et al. |
| 2008/0289020 A1 | 11/2008 | Cameron |
| 2009/0064291 A1 | 3/2009 | Wahl |
| 2009/0217362 A1 | 8/2009 | Nanda et al. |
| 2010/0227680 A1 | 9/2010 | Leopold et al. |
| 2010/0287369 A1 | 11/2010 | Monden |

FOREIGN PATENT DOCUMENTS

| | | |
|---|---|---|
| CN | 1794284 A | 6/2006 |
| EP | 0 767 418 A1 | 4/1997 |
| EP | 0913967 A2 | 5/1999 |
| EP | 0 944 218 A1 | 9/1999 |
| EP | 1 471 682 A1 | 10/2004 |
| EP | 1630734 | 3/2006 |
| EP | 1701505 | 9/2006 |
| EP | 1 729 480 A1 | 12/2006 |
| JP | 63-242751 A | 10/1988 |
| JP | 03-154137 | 7/1991 |
| JP | 11-259733 | 9/1999 |
| JP | 2001-249612 | 9/2001 |
| JP | 2001-282625 | 10/2001 |
| JP | 2001-344205 | 12/2001 |
| JP | 2002-041467 | 2/2002 |
| JP | 2002-057660 | 2/2002 |
| JP | 2002-132730 | 5/2002 |
| JP | 2002-245006 | 8/2002 |
| JP | 2003-337802 | 11/2003 |
| JP | 2003-346055 | 12/2003 |
| JP | 2004-356816 | 12/2004 |
| JP | 2005-38095 | 2/2005 |
| JP | 2005-505991 | 2/2005 |
| JP | 2005-518039 | 6/2005 |
| JP | 2006-139747 | 6/2006 |
| JP | 2006-244474 | 9/2006 |
| JP | 2006-524847 | 11/2006 |
| JP | 2010-517140 A | 5/2010 |
| JP | 2010-517176 A | 5/2010 |
| KR | 1020010110084 | 12/2001 |
| KR | 1020020096442 | 12/2002 |
| KR | 1020040048115 | 7/2004 |
| RU | 2004131027 | 4/2004 |
| RU | 2005120728 A | 7/2004 |
| RU | 2251748 C2 | 5/2005 |
| RU | 2292079 C2 | 1/2007 |
| TW | 200802025 A | 1/2008 |
| WO | WO 96/08092 | 3/1996 |
| WO | WO 99/49614 | 9/1999 |
| WO | WO 01/29641 A2 | 4/2001 |
| WO | WO 03/021837 | 3/2003 |
| WO | WO 03-053123 | 7/2003 |
| WO | WO 2004/036348 | 4/2004 |
| WO | WO 2004/044705 | 5/2004 |
| WO | WO 2004/057796 | 7/2004 |
| WO | WO 2006/122433 | 11/2006 |
| WO | WO 2007/097844 | 8/2007 |
| WO | WO 2008/088944 | 7/2008 |
| WO | WO 2008/088945 | 7/2008 |
| WO | WO 2008/144204 | 11/2008 |

OTHER PUBLICATIONS

"Valimo Mobile Identity Platform for Financial Services", [online], HP, Dec. 2006, pp. 1-4, http://h71028.www7.hp.com/ERC/downloads/4AA0-9344ENW.pdf.

"IIW2005: Mike Jones on Identity Metasystems," Windley's Technometria, Oct. 26, 2005, [online]. [retrieved on Jan. 31, 2012]. Retrieved from the Internet: (URL: http://www.windley.com/archives/2005/10/iiw2005_mike_jo.shtml), 3 pgs.

A Technical Reference for InfoCard v1.0 in Windows, *Microsoft Corporation*, pp. 1-36 (Aug. 2005).

About Authentication, http://www.Microsoft.com/windows 2000/en/server/iis/default.asp?url=/windows2000/en/server/iis/htm/core/iiabasc.htm, pp. 1-5, last updated Feb. 28, 2000.

Access Control Smart Card: Two-Factor Authentication for the Enterprise Logical Access Control for the Enterprise, pp. 1-2, printed on Jul. 12, 2006 from http://www.cardwerk.com/smart-card-solutions/logical-access-control/.

Andy Harjanto's InfoCard WebLog, *MSDN Blogs*, http://blogs.msdn.com/andyhar/archive/2005/11/22/495649.aspx, 3 pages (Nov. 22, 2005).

Audio-Visual Multimodal Fusion for Biometric Person Authentication and Liveness Verification; http://deliverFy.acm.org/10.1145/1160000/1151808/p17-chetty.pdf?key1=1151808&key2=9045972611&coll=GUIDE&dl=GUIDE&CFID=75919783&CFTOKEN=92791909; 2006.

Benjamin, Henry; CCIE Self-Study: Security Protocols, Extensible Authentication Protocol, Protected EAP, and Temporal Key Integrity Protocol, http://www.ciscopress.com/articles/article.asp?p=422947&seqNum=7&rl=1, Oct. 28, 2005, pp. 1-4.

Cameron, K.; "The Laws of Identity," *Architect of Identity, Microsoft Corporation*, pp. 1-12 (May 12, 2005).

Carmody, Steven, "*Information Card Support*", Retrieved at <<https:I/spaces.internet2.edu/display/SHIB2/Information+Card+Support>>, Sep. 23, 2008, pp. 4.

Chappell, David, "*Digital Identity for .NET Applications: A Technology Overview*", Retrieved at <<http://msdn.microsoft.com/en-us/library/bb882216.aspx>>, Aug. 2007, pp. 25.

Chappell; "Introducing Windows CardSpace" [online], MSDN, [retrieved on Nov. 27, 2007], Apr. 2006, pp. 1-18, http://msdn2.microsoft.com/en-us/library/aa480189.aspx#introinfocard_topic2.

Chappell; "Introducing Windows CardSpace" Apr. 2006, 2010 Microsoft Corporation, http://msdn.microsoft.com/en-us/library/aa480189(printer).aspx); 13 pgs.

Chappell; Introducing InfoCard, Apr. 2006, pp. 1-16, http://msdn.microsoft.com/winfx/reference/infocard/default.aspx?pull=/library/en-us/dnlong/html/introinfocard.asp.

Computations. (2001), In Chambers 21st Century Dictionary, London: Chambers Harrap., Retrieved May 26, 2009 from <http://www.credoreference.com/entry/chambdict/computational>.

Computer Security Institute, "What InfoCard Is and Isn't", May 2006, 4 pgs.

Costa et al. "E-Services in Mission-Critical Organizations: Identification Enforcement," ICEIS 2004—Software Agents and Internet Computing, http://www-lih.univ-lehavre.fr/Intranet/proceedings/ICEIS2004/ICEIS %202004/Area%204%20-%20Software %20Agents%20and%20Internet%20Computing/Oral %20Presentations/Short%20Papers/ C4_727_Costa.pdf. [8 pages].

Daemen et al., "The Identity Metasystem: Towards a Privacy-Compliant Solution to the Challenges of Digital Identity"; Oct. 2006; Microsoft Corporation White Paper; 21 pgs.

Display. (2000), In Collins English Dictionary, London: Collins, Retrieved May 26, 2009 from <http://www.credoreference.com/entry/hcengdict/display>.

Ernst, Johannes. "What is Microsoft InfoCard?" Johannes Ernst's Blog, May 18, 2005, http://netmesh.info/jernst/digital_identity/what-is-microsoft-infocard.

Evans et al.; "Private key infrastructure: balancing computer transmission privacy with changing technology and security demands," *Computer Standards & Interfaces*, vol. 27, pp. 423-437 (2005).

Fahrenholtz et al., "Transactional Security for a Distributed Reputation Management System", Lecture Notes in Computer Science, vol. 2455, 2002.

Force, G., Sr., Portable data encryption approaches, http://ieeexplore.ieee.org/xpl/freeabs_all.jsp?arnumber=485417, Nat. Semicond. Corp., (1995) 1-page.

(56) References Cited

OTHER PUBLICATIONS

Goldack, Martin, "Lesson Learned: From MS Passport to Cardspace," Jul. 9, 2006, XP55033966, 13 pgs. URL: http://nds.hgl.rub.de/lehre/seminar/ISS06/Goldack_PassportCardSpace.pdf [retrieved on Jul. 26, 2012].
Henninger, D., "XEP-0164: vCard Filtering", XMPP, Nov. 16, 2005, Version 1.0, 7 pgs.
Hunt, R.; "Technological infrastructure for PKI and digital certification," *Computer Communications*, vol. 24, pp. 1460-1471 (2001).
Interoperability Space, Retrieved at <<http://spwiki.editme.com|InteroperabilitySpace>>, Apr. 27, 2007, pp. 21.
Jones, "The Identity Metasystem: A User-Centric, Inclusive Web Authentication Solution", [online], Microsoft, 2005, pp. 1-27, http://www.w3.org/2005/Security/usability-ws/presentations/28-jones-id-metasystem.
Jones, et al., "Identity Metasystem Interoperability Version 1.0", Retrieved at <<http://docs.oasis-open.org/imi/identity/v1.0/identity.html>>, Feb. 19, 2009, pp. 76.
Jones, Michael B., "A Guide to Supporting Information Cards within Web Applications and Browsers as of the Information Card Profile V1.0," Internet Citation, Dec. 1, 2006, XP007918750, 13 pgs. URL: http://citeseerx.ist.psu.edu/viewdoc/download?doi=1 0.1.1.69.9021 &rep1 &type=pdf.
Jøsang et al.; "What You See is Not Always What You Sign," *Proceedings of AUUG2002*, Melbourne, Australia, pp. 1-13 (Sep. 4-6, 2002).
Lancaster et al.; "Public key infrastructure: a micro and macro analysis," *Computer Standards & Interfaces*, vol. 25, pp. 437-446 (2003).
Lee et al., A Flexible Remote User Authentication Scheme Using Smart Cards, Chaoyang University of Technology, pp. 46-52 http://delivery.acm.org/10.1145/570000/567335/p46-lee.pdf?key1=567335&key2=8102952511&coll=GUIDE&dl=GUIDE&CFID=912131&CFTOKEN=21372357; Jul. 2002.
Liberty Alliance Project Whitepaper: Personal Identity, Mar. 23, 2006, pp. 1-13.
Lin et al., A flexible biometrics remote user authentication scheme, Tunghai University, (2004), 5 pages, http://islab.cis.thu.edu.tw/files/teacher/115.pdf.
Maximilien et al., "Conceptual Model of Web Service Reputation", © 2002, pp. 1-6.
Maximilien et al., "Reputation and Endorsement for Web Services", ACM Inc. printed Dec. 9, 2005.
Menezes et al., "Handbook of Applied Cryptography", CRC Press, 1996, Chapter 11 included; available at <http://www.cacr.math.uwaterloo.ca/hac> (cited in 0325us01 Oct. 14, 2009 OA).
Microsoft Corporation, Ping Identity Corporation, "A Guide to Integrating with InfoCard v1. 0," pp. 1-62 (Aug. 2005).
Nakamura et al. "Model-Driven Security Based on a Web Services Security Architecture," Proceedings of the 2005 IEEE International Conference on Services Computing (Scc'05), Jul. 15, 2005. [9 pages].
*Otto Store: Walking through the CardSpace Experience*, Retrieved at <<http://blogs.msdn.com/vbertocci/ archive/2007102/03/Otto-store-walk ing-through-the-cardspace-experience.aspx>>, pp. 12.
Party. (2004), In Roget's II The New Thesaurus, Boston, MA: Houghton Mifflin, <http://www.credoreference.com/entry/hmrogets/party>. (cited in 0325us01 Aug. 11, 2009 AA).
Q&A: Microsoft's Kim Cameron Wins 'Balancing Innovation and Reality' Award for Contributions to Digital Identity, *Microsoft PressPass*, 3 pages (May 12, 2005).
Recordon, David and Reed, Drummond, "OpenID 2.0: A Platform for User-Centric Identity Management," Conference on Computer and Communications Security Proceedings of the Second ACM Workshop on Digital Identity Management, ACM, XP007907214, New York, NY, Nov. 3, 2006, 6 pgs.
Resnick et al., "ACM Portal, the ACM Digital Library", Reputation Systems, vol. 43, No. 12, http://delivery.acm.org/10.1145/ 360000/355122/p45-resnick.html?key1+355122&key2=18 . . . (2000).
Techtree News Staff, "Infocard Spells End of Passwords." Techtree.com India, Feb. 16, 2006, 2 pgs.
The fusion framework in a person identity verification system based on face and speech data http://ieeexplore.ieee.org/search/srchabstract.jsp?arnumber=1557132&isnumber=33117&punumber=10384&k2dockey=1557132@ieeecnfs&query=%28++identity+verification%3Cin%3Ede%29&pos=14; May 2005.
Token. (2000), In Collins English Dictionary, London: Collins, <http://www.credoreference.com/entry/hcengdict/token>. (cited in 0325us01 Aug. 11, 2009 AA).
Von Welch et al. "Security for Grid Services," Proceedings of the 12th IEEE International Symposium on High Performance Distributed Computing (HPDC'03), Jun. 24, 2003. [10 pages].
Wireless Application Forum, Ltd. "WAP Provisioning Smart Card," Jul. 10, 2001, http://simon.dehartog.nl/datasheets/protocols/WAP/WAP-186-PROVSC-20010710-a.pdf. [37 pages].
You, Mobile Card Architecture for User Mobility and VHE in Heterogeneous Network Environments, http://www.cnsr.info/Download/PDF/poster1.pdf., University of New Brunswick (2003) 2 pages.
Chinese 2nd Office Action cited in Application No. 200880002607.6 dated Mar. 22, 2011, 16 pgs.
Chinese 2nd Office Action cited in Application No. 200880003205.8 mailed Dec. 22, 2011, 8 pgs.
Chinese 2nd Office Action in Application 2007800065841 mailed Sep. 7, 2011, 9 pgs.
Chinese 2nd Office Action in Application 2008800026930 mailed Sep. 7, 2011, 9 pgs.
Chinese 2nd Office Action mailed in Application No. 200680047525.4 mailed Apr. 20, 2011, 11 pgs.
Chinese 2nd Office Action mailed in Application No. 200880015890.6 mailed Apr. 18, 2012, 7 pgs.
Chinese 3rd Office Action cited in Application No. 200880003205.8 mailed Apr. 23, 2012, 6 pgs.
Chinese 3rd Office Action in Application 2008800026930, mailed Dec. 13, 2011, 14 pgs.
Chinese 3rd Office Action in Application 200880015890.6, Jul. 18, 2012, 7 pgs.
Chinese 4th Office Action in Application 200880003205.8, mailed Aug. 24, 2012, 8 pgs.
Chinese 5th Office Action in Application 200880003205.8, mailed Oct. 8, 2013, 10 pgs.
Chinese Decision on Re-Exam mailed in Application 200880002607.6, mailed Dec. 30, 2013, 14 pgs.
Chinese Decision on Reexamination in Application 200880003205.8, mailed Jun. 14, 2013, 2 pgs.
Chinese Decision on Rejection in Application 2008800026930, mailed May 3, 2012, 12 pgs.
Chinese Final Rejection in Application 200780006584.1, mailed May 2, 2012, 9 pgs.
Chinese Final Rejection in Application 200880003205.8, mailed Jan. 25, 2013, 8 pgs.
Chinese Notice of Allowance in Application 200680047525.4 mailed Feb. 23, 2012, 4 pgs.
Chinese Notice of Having Deemed to Have Been Withdrawn in Application 2008800158906, mailed Dec. 14, 2012, 2 pgs.
Chinese Notice of Reexamination in Application 200880002607.6, mailed May 23, 2013, 8 pgs.
Chinese Notice of Reexamination in Application 200880002607.6, mailed Aug. 2, 2013, 8 pgs.
Chinese Office Action cited in Application No. 200680047525.4 mailed Nov. 10, 2010, 12 pgs.
Chinese Office Action cited in Application No. 200780006584.1 mailed Aug. 4, 2010, 21 pgs.
Chinese Office Action cited in Application No. 200880002607.6 mailed Sep. 14, 2010, 34 pgs.
Chinese Office Action cited in Application No. 200880002693.0 dated Jan. 12, 2011, 22 pgs.
Chinese Office Action cited in Application No. 200880003205.8 mailed Jun. 12, 2010, 16 pgs.
Chinese Office Action mailed in Application No. 200880015890.6 mailed Jul. 20, 2011, 10 pgs.

(56) References Cited

OTHER PUBLICATIONS

Chinese Third Office Action Decision on Rejection mailed in Application No. 200880002607.6 mailed Jul. 26, 2011, 17 pgs.
European Communication and Supplemental Search Report in Application No. 08 713 522.4 mailed Jul. 25, 2011, 9 pgs.
European Communication and Supplemental Search Report re EP Application No. 08713521.6, mailed Jul. 20, 2011, 9 pgs.
European Communication from Search Division cited in Application No. 08 713 521.6 mailed Apr. 11, 2011, 2 pgs.
European Communication from Search Division cited in Application No. 08 713 522.4 mailed Apr. 11, 2011, 2 pgs.
European Communication in Application EP 08828497.1, mailed Mar. 23, 2012, 2 pgs.
European Examination Report cited in EP 06 838 382 7 mailed Nov. 19, 2009, 5 pgs.
European Minutes of the Oral Proceedings in EP Application No. 07748971.4, mailed Apr. 8, 2011, 22 pgs.
European Office Action in Application 08713521.6, mailed Oct. 26, 2012, 6 pgs.
European Office Action in Application 08713522.4, mailed Nov. 15, 2012, 7 pgs.
European Office Action in EP Application No. 07748971.4, mailed Jan. 20, 2010, 5 pgs.
European Oral Hearing Summons in EP Application No. 07748971.4, mailed Nov. 29, 2010, 6 pgs.
European Search Report cited in EP 06 838 382 7 mailed Sep. 18, 2009, 11 pgs.
European Supplementary Search Report and Opinion cited in Application No. PCT/US2007001362 mailed Oct. 7, 2009, 1 pg.
Extended European Search Report issued in Patent Application 08828497.1, dated Aug. 30, 2012, 8 pgs.
International Search Report and Written Opinion cited in PCT/US2006/045386 mailed Apr. 20, 2007, 11 pgs.
International Search Report and Written Opinion cited in PCT/US2007/001362 mailed Jun. 27, 2007, 8 pgs.
International Search Report cited in PCT/EP 00/10284 mailed Aug. 20, 2001, 3 pgs.
International Search Report cited in PCT/US2008/050204 mailed Jun. 12, 2008, 9 pgs.
International Search Report cited in PCT/US2008/050205 mailed May 14, 2008, 12 pgs.
International Search Report cited in PCT/US2008/051814 mailed Apr. 30, 2009, 3 pgs.
International Search Report cited in PCT/US2008/062521 mailed Sep. 22, 2008, 10 pgs.
Japanese Notice of Allowance in Application 2008-545618, mailed May 23, 2012, 6 pgs.
Japanese Notice of Allowance in Application 2009-546456 mailed Mar. 29, 2013, 6 pgs.
Japanese Notice of Allowance in Application 2009-546457, mailed Mar. 29, 2013, 6 pgs.
Japanese Notice of Allowance in Application 2009547403, mailed Jan. 14, 2014, 4 pgs.
Japanese Notice of Final Rejection in Application 2008-556319, mailed Apr. 6, 2012, 4 pgs.
Japanese Notice of Rejection in Application 2008545618 mailed Sep. 13, 2011, 4 pgs.
Japanese Notice of Rejection in Application 2008-545618, mailed Feb. 7, 2012, 4 pgs.
Japanese Notice of Rejection in Application 2008-556319 mailed Sep. 22, 2011, 7 pgs.
Japanese Notice of Rejection in Application 2009-546456, mailed Dec. 7, 2012, 6 pgs.
Japanese Notice of Rejection in Application 2009-546457, mailed Dec. 7, 2012, 4 pgs.
Japanese Notice of Rejection in Application 2009-547403, mailed Dec. 21, 2012, 7 pgs.
Japanese Notice of Rejection in Application 2009-547403, mailed Sep. 18, 2013, 6 pgs.
Notice of Allowance/Decision to Grant in Russian Application No. 2008124907 mailed Dec. 15, 2010, 5 pages, English translation.
Russian Notice of Allowance in Application 2009127801, mailed Apr. 10, 2012, 7 pgs.
Russian Notice of Allowance in Application 2009127802, mailed Aug. 30, 2012, 6 pgs.
Russian Notice of Allowance in Application 2009141971, mailed May 15, 2012, 6 pgs.
Search Report for Taiwan Patent Application No. 097101053, mailed Jul. 16, 2013, 1 page.
Taiwan Notice of Allowance in Application 97101053, mailed Nov. 28, 2013, 4 pgs.
Taiwan Search Report and Office Action in Application 097100736, mailed Oct. 17, 2013, 14 pgs.
Taiwan Search Report in Application 097101545, mailed Nov. 8, 2013, 1 pg.
Taiwanese Notice of Allowance in Application 97100736, mailed Jan. 28, 2014, 4 pgs.
Written Opinion of the International Searching Authority cited in PCT/US2007/013310 mailed Dec. 4, 2007, 6 pgs.
Taiwanese Notice of Allowance in Application 97101545, mailed Mar. 10, 2014, 4 pgs.
Chinese Notice of Allowance in Application 200880003205.8, mailed Feb. 28, 2014, 4 pgs.
Notice of Allowance cited in U.S. Appl. No. 11/312,920 mailed Jun. 22, 2010, 9 pgs.
Notice of Allowance cited in U.S. Appl. No. 11/361,281 mailed Apr. 28, 2011, 22 pgs.
Notice of Allowance cited in U.S. Appl. No. 11/361,281 mailed Aug. 18, 2011, 10 pgs.
Notice of Allowance cited in U.S. Appl. No. 11/361,281 mailed Dec. 8, 2010, 20 pgs.
Notice of Allowance cited in U.S. Appl. No. 11/361,281 mailed May 25, 2011, 8 pgs.
Notice of Allowance cited in U.S. Appl. No. 11/495,826 mailed Aug. 4, 2011, 8 pgs.
Notice of Allowance cited in U.S. Appl. No. 11/495,826 mailed Mar. 17, 2011, 17 pgs.
Notice of Allowance cited in U.S. Appl. No. 11/495,826 mailed Oct. 15, 2010, 6 pgs.
Notice of Allowance cited in U.S. Appl. No. 11/495,830 mailed Apr. 19, 2011, 24 pgs.
Notice of Allowance cited in U.S. Appl. No. 11/495,830 mailed May 26, 2011, 9 pgs.
Notice of Allowance cited in U.S. Appl. No. 11/495,830 mailed Oct. 5, 2011, 7 pgs.
Notice of Allowance cited in U.S. Appl. No. 11/856,617 mailed Mar. 29, 2011, 17 pgs.
Notice of Allowance mailed in U.S. Appl. No. 11/856,617 mailed Aug. 31, 2011, 7 pgs.
U.S. Office Action cited in U.S. Appl. No. 11/312,920 mailed Apr. 15, 2009, 15 pgs.
U.S. Office Action cited in U.S. Appl. No. 11/312,920 mailed Dec. 31, 2009, 16 pgs.
U.S. Office Action cited in U.S. Appl. No. 11/312,920 mailed Sep. 8, 2009, 11 pgs.
U.S. Office Action cited in U.S. Appl. No. 11/361,281 mailed Aug. 16, 2010, 16 pgs.
U.S. Office Action cited in U.S. Appl. No. 11/361,281 mailed Jan. 21, 2010, 14 pgs.
U.S. Office Action cited in U.S. Appl. No. 11/361,281 mailed Jun. 23, 2009, 19 pgs.
U.S. Office Action cited in U.S. Appl. No. 11/361,857 mailed Mar. 31, 2010, 13 pgs.
U.S. Office Action cited in U.S. Appl. No. 11/361,857 mailed May 29, 2009, 11 pgs.
U.S. Office Action cited in U.S. Appl. No. 11/361,857 mailed Nov. 10, 2008, 22 pgs.
U.S. Office Action cited in U.S. Appl. No. 11/361,857 mailed Oct. 14, 2009, 12 pgs.
U.S. Office Action cited in U.S. Appl. No. 11/495,826 mailed Jul. 15, 2009, 21 pgs.

(56) References Cited

OTHER PUBLICATIONS

U.S. Office Action cited in U.S. Appl. No. 11/495,826 mailed Mar. 30, 2010, 12 pgs.
U.S. Office Action cited in U.S. Appl. No. 11/495,830 mailed Aug. 30, 2010, 17 pgs.
U.S. Office Action cited in U.S. Appl. No. 11/495,830 mailed Jul. 16, 2009, 14 pgs.
U.S. Office Action cited in U.S. Appl. No. 11/495,830 mailed Mar. 3, 2010, 17 pgs.
U.S. Office Action cited in U.S. Appl. No. 11/749,020 mailed Dec. 27, 2010, 17 pgs.
U.S. Office Action cited in U.S. Appl. No. 11/749,020 mailed Jun. 10, 2011, 30 pgs.
U.S. Office Action cited in U.S. Appl. No. 11/749,020 mailed Oct. 5, 2011, 18 pgs.
U.S. Office Action cited in U.S. Appl. No. 11/856,617 mailed Sep. 13, 2010.
U.S. Office Action cited in U.S. Appl. No. 11/856,636 mailed May 4, 2011, 25 pgs.
U.S. Office Action cited in U.S. Appl. No. 11/856,636 mailed Oct. 14, 2011, 15 pgs.
U.S. Office Action cited in U.S. Appl. No. 11/856,636 mailed Oct. 7, 2010.
U.S. Office Action cited in U.S. Appl. No. 11/952,890 mailed Apr. 8, 2011, 21 pgs.
U.S. Office Action cited in U.S. Appl. No. 11/952,890 mailed Oct. 7, 2010.
U.S. Office Action Response cited in U.S. Appl. No. 11/312,920 mailed Jul. 15, 2009, 13 pgs.
U.S. Office Action Response cited in U.S. Appl. No. 11/312,920 mailed Mar. 31, 2010, 12 pgs.
U.S. Office Action Response cited in U.S. Appl. No. 11/312,920 mailed Nov. 6, 2009, 11 pgs.
U.S. Office Action Response cited in U.S. Appl. No. 11/361,281 mailed Apr. 21, 2010, 12 pgs.
U.S. Office Action Response cited in U.S. Appl. No. 11/361,281 mailed Nov. 16, 2010, 15 pgs.
U.S. Office Action Response cited in U.S. Appl. No. 11/361,281 mailed Sep. 23, 2009, 14 pgs.
U.S. Office Action Response cited in U.S. Appl. No. 11/361,857 mailed Dec. 30, 2009, 9 pgs.
U.S. Office Action Response cited in U.S. Appl. No. 11/361,857 mailed Feb. 10, 2009, 15 pgs.
U.S. Office Action Response cited in U.S. Appl. No. 11/361,857 mailed Jul. 29, 2009, 6 pgs.
U.S. Office Action Response cited in U.S. Appl. No. 11/361,857 mailed Jun. 30, 2010, 6 pgs.
U.S. Office Action Response cited in U.S. Appl. No. 11/361,857 mailed Sep. 29, 2009, 10 pgs.
U.S. Office Action Response cited in U.S. Appl. No. 11/495,826 mailed Aug. 30, 2010, 13 pgs.
U.S. Office Action Response cited in U.S. Appl. No. 11/495,826 mailed Dec. 15, 2009, 12 pgs.
U.S. Office Action Response cited in U.S. Appl. No. 11/495,830 mailed May 3, 2010, 13 pgs.
U.S. Office Action Response cited in U.S. Appl. No. 11/495,830 mailed Nov. 16, 2009, 15 pgs.
U.S. Office Action Response cited in U.S. Appl. No. 11/495,830 mailed Nov. 30, 2010, 14 pgs.
U.S. Office Action Response cited in U.S. Appl. No. 11/749,020 mailed Mar. 28, 2011, 11 pgs.
U.S. Office Action Response cited in U.S. Appl. No. 11/856,617 mailed Dec. 13, 2010, 16 pgs.
U.S. Office Action Response cited in U.S. Appl. No. 11/856,617 mailed May 23, 2011, 6 pgs.
U.S. Office Action Response cited in U.S. Appl. No. 11/856,636 mailed Feb. 1, 2011, 16 pgs.
U.S. Office Action Response in U.S. Appl. No. 11/952,890 mailed Jul. 8, 2011, 12 pgs.
U.S. Office Action Response mailed in U.S. Appl. No. 11/952,890 mailed Jan. 7, 2011, 15 pgs.
U.S. Appl. No. 11/856,636 Amendment and Response filed Jan. 17, 2012, 13 pgs.
U.S. Appl. No. 11/856,636 Amendment and Response filed Jul. 20, 2012, 16 pgs.
U.S. Appl. No. 11/856,636, Amendment and Response filed Dec. 21, 2012, 8 pgs.
U.S. Appl. No. 11/856,636, Notice of Allowance mailed Oct. 31, 2012, 2 pgs.
U.S. Appl. No. 11/856,636, Notice of Allowance mailed Nov. 29, 2012, 2 pgs.
U.S. Appl. No. 11/856,636, Notice of Allowance mailed Feb. 27, 2013, 2 pgs.
U.S. Appl. No. 11/856,636, Notice of Allowance mailed Sep. 27, 2012, 7 pgs.
U.S. Appl. No. 11/856,636, USPTO Response mailed Jan. 2, 2013, 2 pgs.
U.S. Appl. No. 12/432,606, Amendment and Response filed Feb. 27, 2012, 6 pgs.
U.S. Appl. No. 12/432,606, Office Action mailed Feb. 1, 2012, 13 pgs.
U.S. Appl. No. 12/432,606, Office Action mailed May 15, 2012, 16 pgs.
U.S. Appl. No. 11/361,857, Amendment and Response filed Apr. 1, 2012, 7 pgs.
U.S. Appl. No. 11/361,857, Office Action mailed Dec. 2, 2011, 12 pgs.
U.S. Appl. No. 11/361,857, Office Action mailed Jun. 27, 2012, 11 pgs.
U.S. Appl. No. 11/749,020, Amendment and Response filed Jan. 5, 2012, 13 pgs.
U.S. Appl. No. 11/749,020, Amendment and Response filed Oct. 2, 2012, 6 pgs.
U.S. Appl. No. 11/749,020, Amendment and Response filed Jul. 11, 2012, 14 pgs.
U.S. Appl. No. 11/749,020, Notice of Allowance mailed Aug. 20, 2012, 5 pgs.
U.S. Appl. No. 11/749,020, Office Action mailed Mar. 13, 2012, 12 pgs.
U.S. Appl. No. 11/856,636, Office Action mailed Apr. 23, 2012, 17 pgs.
U.S. Appl. No. 11/952,890, Amendment and Response filed Feb. 29, 2012, 12 pgs.
U.S. Appl. No. 11/952,890, Amendment and Response filed Jul. 8, 2013, 13 pgs.
U.S. Appl. No. 11/952,890, Notice of Allowance mailed Oct. 21, 2013, 13 pgs.
U.S. Appl. No. 11/952,890, Office Action mailed Dec. 22, 2011, 13 pgs.
U.S. Appl. No. 11/952,890, Office Action mailed Apr. 8, 2013, 10 pgs.
Chinese Notice of Allowance in Application 200880002607.6, mailed May 5, 2014, 6 pgs.
European Official Communication in Application 08713521.6, mailed Jun. 17, 2014, 5 pgs.
Chinese Notice on Re-Examination in Appiication 200880002693.0, mailed Nov. 14, 2014, 15 pgs.
European Official Communication in Application 08723522.4, mailed Nov. 13, 2014, 3 pgs.
Chinese Notice of Allowance in Application 200880002693.0, mailed Jul. 15, 2015, 6 pgs.
Chinese Decision on Re-Examination in Application 200880002893.0, mailed Mar. 25, 2015, 13 pgs.

\* cited by examiner

REMOTE ACCESS OF DIGITAL IDENTITIES

RELATED APPLICATION/CLAIM OF PRIORITY

This application claims the benefit of U.S. Provisional Patent Application No. 60/886,894, entitled "Remote Access of Digital Identities," filed on or about Jan. 26, 2007.

BACKGROUND

Increased efforts are being made to give individuals more control over how their personal identity information is distributed and used, particularly in a digital context. For example, Microsoft Corporation of Redmond, Wash., among others, has propagated a system sometimes referred to as the Information Card Selector—Microsoft's instantiation is generally referred to as Windows CardSpace. In a Windows CardSpace system, a principal obtains one or more digital identity representations, sometimes referred to as information cards. When the principal attempts to access a resource (a "relying party") that requires a set of claims made about the principal, the principal employs a digital identity representation (hereafter called a "DIR") to initiate communication with an identity provider that can assert those claims. In some cases, the identity provider may be controlled by a principal and run on the principal's own machine. In others it may be controlled by a third party. The identity provider returns an "identity token" that includes the required claims information.

DIRs are useful in, among other contexts, complying with relying-party requests for identity tokens. Providing easy and secure use of DIRs is advantageous to principals seeking access to such relying parties.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect relates to a method for controlling distribution of DIRs. A first device receives a request for a DIR. A user of the first device is prompted to accept or deny the request. If the request is accepted, the DIR is provided. In embodiments, the user of the first device is the principal about which the DIR defines claims. In other embodiments, the user of the first device is not the principal. In embodiments, the first device does not have a sense of time, and the DIR includes a use restriction that is based on a time stamp provided in the request for the DIR from the second device. In further embodiments, the first device includes an identity provider, and before the DIR is provided to the second device, the address for the identity provider in the DIR is changed to an externally accessible address of the first device.

Another aspect relates to a computer program product for controlling use of a DIR. A first device receives a request from a second device to use the DIR. The user of the first device is prompted to accept or deny the request. If the request is accepted, permission to use the DIR is provided. Again, in embodiments, the user of the first device may or may not be the principal about which the DIR includes claims.

Still another aspect relates to a method for using a DIR. A request for an identity token is received from a relying party. A request is sent to a first device from a second device to obtain the DIR. The digital identity representation includes metadata describing at least a first claim about a principal and the DIR is received at the second device. A request to use the DIR is sent from the second device. The second device receives permission to use the DIR, and the DIR is then used to obtain the identity token. The identity token is sent to the relying party.

DETAILED DESCRIPTION

Example embodiments will now be described more fully hereinafter with reference to the accompanying drawings. Like numbers refer to like elements throughout.

Example embodiments disclosed herein relate generally to identity systems including DIRs used in initiating communication for production of identity tokens that can be exchanged between a principal, an identity provider, and a relying party to authenticate an identity and/or information related to the principal. In example embodiments herein, the principal may be a natural person or persons, a computer, a network, or any other entity. The relying party has goods, services, or other information that the principal desires to access and/or obtain. In example embodiments, the relying party can be any resource, privilege, or service that requires a security policy to enter, access, or use. For example, a relying party may comprise one or more of: computers, computer networks, data, databases, buildings, personnel, services, companies, organizations, physical locations, electronic devices, or any other type of resource.

Figure 1:
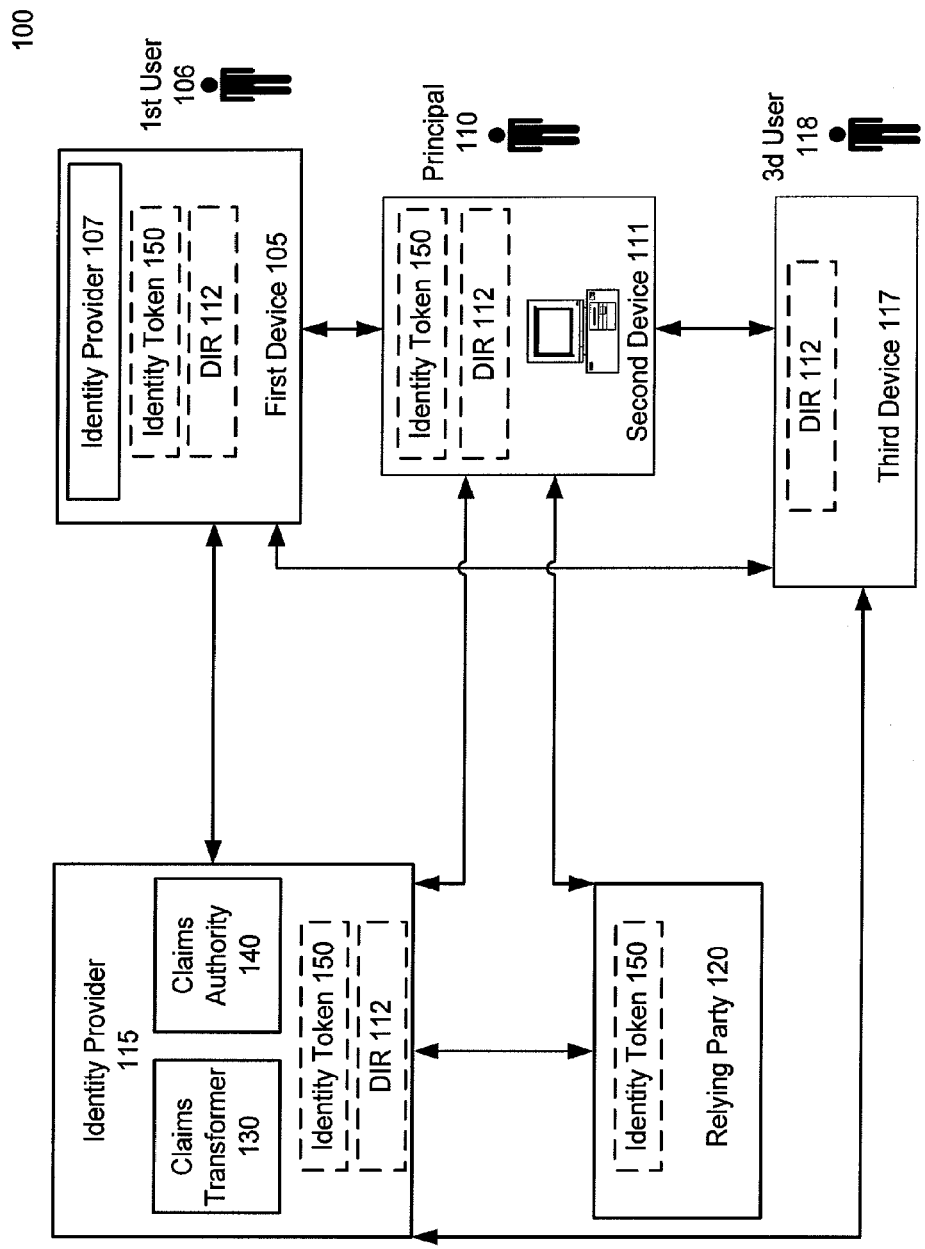
FIG. 1 illustrates an example DIR distribution and use system.

Referring now to FIG. 1, an example DIR system 100 is shown including a first device 105, first user 106, principal 110, second device 111, third device 117, third user 118, and a relying party 120. First device 105 includes a computer system at least temporarily controlled by first user 106. Second device 111 includes a computer system at least temporarily controlled by the principal 110. Third device 117 includes a computer system at least temporarily controlled by third user 118. As will be discussed herein, the first user 106, principal 110, and third user 118 may comprise three different people or entities or may, in embodiments, comprise the same people or entities. Relying party 120 may also include a computer system. System 100 may also include an identity provider 115 and identity provider 107, each of which are discussed further below and may include, or be part of, a computer system.

First device 105, second device 111, third device 117, identity provider 115, and relying party 120 can communicate with each other over one or more networks, such as the Internet, or through telephonic or other forms of wired or wireless communication. In example embodiments, principal 110 can use second device 111 to request goods, services, information, privileges, or other access from relying party 120. Relying party 120 can require authentication of the identity of, or information about, principal 110 before or in conjunction with providing the requested access to principal 110.

Also shown in FIG. 1 is an example identity provider 115. Identity provider 115 includes a computer system. In example embodiments, identity provider 115 includes a claims transformer 130 and a claims authority 140. The claims transformer 130 is sometimes referred to as a "security token service." In the example shown, identity provider 115 can provide one or more claims about principal 110. A claim is a statement or assertion made about the principal, possibly including information about the principal such as, for example, name, address, social security number, age, credit history, transactional requirements, etc. As described further below, identity provider 115 can provide claims to relying party 120 in the form of a digitally signed identity token. In example embodiments, identity provider 115 is in a trusted relationship with relying party 120, so that relying party 120 trusts the claims in the signed identity token from identity provider 115. In embodiments, identity provider 107 may be identical or similar to identity provider 115 but may be part of first device 105 rather than a separately controlled computer system.

Although claims transformer 130 and claims authority 140 of identity provider 115 are shown as separate entities in FIG. 1, in alternative embodiments claims transformer 130 and claims authority 140 can be the same entity or different entities or systems. Identity provider 115 may take the form of a security token service in some example embodiments. Similarly, first device 105, second device 111, and third device 117 may be the same or different entities or systems.

Computer systems described herein include, without limitation, a personal computer, server computer, hand-held or laptop device, microprocessor system, microprocessor-based system, programmable consumer electronics, network PCs, minicomputers, mainframe computer, smart card, telephone, mobile or cellular communication device, personal data assistant, distributed computing environment that includes any of the above systems or devices, and the like. Some computer systems described herein may comprise portable computing devices. A portable computing device is any computer system that is designed to be physically carried by a user. Each computer system may also include one or more peripherals, including without limitation: keyboard, mouse, a camera, a web camera, a video camera, a fingerprint scanner, an iris scanner, a display device such as a monitor, a microphone, or speakers. The term "computer system" is used herein interchangeably with "device."

Each computer system includes an operating system, such as (without limitation) the WINDOWS operating system from Microsoft Corporation, and one or more programs stored on the computer readable media. Each computer system may also include one or more input and output communications devices that allow the user to communicate with the computer system, as well as allow the computer system to communicate with other devices. Communications between the computer systems of FIG. 1 (e.g., first device 105, second device 111, third device 117, identity provider 115, and relying party 120 can be implemented using any type of communications link, including, without limitation, the Internet, wide area networks, intranets, Ethernets, direct-wired paths, satellites, infrared scans, Bluetooth, cellular communications, or any other type of wired or wireless communications.

In some example embodiments disclosed herein, system 100 is implemented at least in part as an Information Card system provided in the .NET 3.0 framework developed by Microsoft Corporation of Redmond, Wash. The Information Card system allows users to manage multiple DIRs from various identity providers. Each of the first device 105, second device 111, and third device 117 may include an identity selector, such as Windows CardSpace from Microsoft Corporation of Redmond, Wash.

The Information Card system utilizes a web services platform such as the Windows Communication Framework in the .NET 3.0 framework. In addition, the Information Card system is built using the Web Services Security Specifications propagated at least in part by Microsoft Corporation of Redmond, Wash. These specifications include a message security model WS-Security, an endpoint policy WS-SecurityPolicy, a metadata exchange WS-MetadataExchange, and a trust model WS-Trust. Generally, the WS-Security model describes how to attach identity tokens to messages. The WS-SecurityPolicy model describes end point policy requirements, such as required identity tokens and supported encryption algorithms. Such policy requirements can be conveyed and negotiated using a metadata protocol defined by WS-MetadataExchange. The WS-Trust model describes a framework for trust models that enables different web services to interoperate. Some example embodiments described herein refer to the Web Services Security Specifications described above. In alternative embodiments, one or more other specifications can be used to facilitate communications between the various subsystems in system 100.

Referring again to FIG. 1, principal 110 can send a request via second device 111 to relying party 120 for access to goods, services, or other information. For example, in one embodiment, second device 111 sends a request to relying party 120 to perform an operation at relying party 120, such as complete an online purchase. The request sent by second device 111 can include a request for the authentication requirements of relying party 120 using, for example, the mechanisms provided in WS-MetadataExchange.

In response to the request, relying party 120 may send second device 111 requirements for relying party 120 to authenticate principal's identity or other information about principal 110. The requirements of relying party 120 for authentication are referred to herein as a security policy. A security policy minimally defines the set of claims from a trusted identity provider 115 or identity provider 107 that the principal 110 must provide to relying party 120 for relying party 120 to authenticate principal 110. A security policy can include a requirement of proof regarding a personal characteristic (such as age), identity, financial status, etc. It can also include rules regarding the level of verification and authentication required to authenticate any offers of proof (e.g., digital signature from a particular identity provider).

In one example, relying party 120 specifies its security policy using WS-SecurityPolicy, including both the claim requirements and type of identity token required by relying party 120. Examples of types of claims include, without limitation, the following: first name, last name, email address, street address, locality name or city, state or province, postal code, country, telephone number, social security number, date of birth, gender, personal identifier number, credit score, financial status, legal status, etc.

The security policy can also be used to specify the type of identity token required by relying party 120, or a default type can be used as determined by the identity provider. In addition to specifying the required claims and token type, the security policy can specify a particular identity provider required by the relying party. Alternatively, the policy can omit this element, leaving the determination of the appropriate identity provider up to principal 110. Other elements can be specified in the security policy as well such as, for example, the freshness of the required security token.

In some embodiments, principal 110 can require that relying party 120 identify itself to second device 111 so that principal 110 can decide whether or not to satisfy the security policy of relying party 120, as described below. In one example, relying party 120 identifies itself using an X509 certificate. In other embodiments, relying party 120 can identify itself using other mechanisms such as, for example, a Secure Sockets Layer ("SSL") server certificate.

Second device 111 may include one or more DIRs 112 for principal 110. These DIRs 112 (sometimes referred to as "Information Cards" in the Windows CardSpace system provided in the .NET 3.0 framework developed by Microsoft Corporation of Redmond, Wash.) are artifacts that represent the token issuance relationship between principal 110 and a particular identity provider, such as identity provider 115. Each DIR may correspond to a particular identity provider, and principal 110 can have multiple DIRs 112 from the same or different identity providers.

DIRs 112 can include, among other information, the identity provider's issuance policy for identity tokens, including the type of tokens that can be issued, the claim types for which it has authority, and/or the credentials to use for authentication when requesting identity tokens. DIRs 112 may be represented as XML documents that are issued by identity providers 115 or DIR generation systems and stored on a storage device such as second device 111, first device 105, and/or third device 117. The DIRs 112 represented in the various devices of FIG. 1 may be different copies of the same DIR, different DIRs, or DIRs with the same claims but adapted for use in different devices as described further herein.

As discussed, second device 111 may also include an identity selector. Generally, an identity selector is a computer program and user interface that permits principal 110 to select between one or more DIRs 112 of principal 110 on second device 111. DIRs 112, in turn, can be used to request and obtain identity tokens from one or more identity providers, such as identity provider 115. For example, when a security policy from relying party 120 is received by second device 111, the identity selector may be programmed to identify one or more DIRs 112 that satisfy one or more of the claims required by the security policy using the information in DIRs 112. Once principal 110 receives the security policy from relying party 120, principal 110 can communicate with (using, for example, second device 111) one or more identity providers to gather the claims required by the policy.

In example embodiments, when principal has access to an appropriate DIR on second device 111, principal 110 uses the DIR 112 to request one or more identity tokens from identity provider 115 using the issuance mechanism described in WS-Trust. The identity of relying party 120 can, but need not, be specified in the request sent by principal 110 to identity provider 115. The request can include other requirements as well, such as a request for a display token.

Generally, claims authority 140 of identity provider 115 can provide one or more of the claims required by the security policy from relying party 120. Claims transformer 130 of identity provider 115 is programmed to transform the claims and to generate one or more signed identity tokens 150 that include the claim(s) relating to principal 110.

Principal 110 can request an identity token in a certain format in its request to identity provider 115, based on requirements from relying party 120. Claims transformer 130 can be programmed to generate identity tokens in one of a plurality of formats including, without limitation, X509, Kerberos, SAML (versions 1.0 and 2.0), Simple eXtensible Identity Protocol ("SXIP"), etc. Such requirements can be included in the DIR.

In example embodiments, claims transformer 130 forwards the identity token 150 to principal 110 using the response mechanisms described in WS-Trust. In one embodiment, claims transformer 130 includes a security token service (sometimes referred to as an "STS"). In an example embodiment, principal 110 forwards identity token 150 to relying party 120 by binding identity token 150 to an to application message using the security binding mechanisms described in WS-Security. In other embodiments, identity token 150 may be sent directly from the identity provider 115 to relying party 120.

Once relying party 120 receives identity token 150, relying party 120 can verify (e.g., by decoding or decrypting the identity token 150) the origin of signed identity token 150. Relying party 120 can also utilize the claim(s) in identity token 150 to satisfy the security policy of relying party 120 to authenticate principal 110 and permit principal 110 to complete the requested operation.

In embodiments, however, second device 111 will not have in local storage an appropriate DIR 112 that refers to claims required by the security policy of relying party 120. For example, on occasion, a principal 110 may use a second device 111 that is publicly accessible (e.g., public library, airport kiosk, unprotected computer terminal, etc.) to attempt to access or perform operations at relying party 120. In this instance, principal 110 may desire to use a DIR 112 stored on another device, such as first device 105 or third device 117. Use of such remotely stored DIRs 112 is now discussed in more detail.

On occasion, principal 110 may use a different device to store DIRs 112 than the device the principal 110 uses to attempt to access a relying party, such as relying party 120. For example, a principal 110 may use a mobile device, such as a cellular phone, to store DIRs 112, but may wish to use a device with a richer user interface, such as a personal computer ("PC"), to interact with a relying party. In embodiments, the principal 110 requests that a DIR 112 be provided from first device 105 to second device 111 for use in accessing relying party 120. First user 106 is prompted to approve the release of DIR 112 to second device 111, and in embodiments the DIR 112 requested is not sent to the second device 111 until such approval is received. In other embodiments, the DIR 112 is stored on third device 117, but approval for release of DIR 112 to second device 111 is required from first user 106 before the third device 117 releases DIR 112 to second device 111.

In embodiments, first user 106 and principal 110 are the same person. For example, a principal 110 who stores DIR 112 on a mobile phone and wants to use the DIR at second device 111 (e.g., a PC) on which DIR 112 is not present may both: (a) request the DIR 112 on the second device 111; and (b) approve the release of the DIR 112 to the second device 111 from first device 105 (e.g., the principal's mobile phone). In other embodiments, the release of the DIR to the second device 111 must be approved by a first user 106 and/or third user 118 who are not the same as the principal 110.

In embodiments, DIR 112, as stored on first device 105, will include an internal address pointing to identity provider 107, which may be a service on first device 105. For example, if the DIR 112 is "self-issued" by the first device 105 (e.g., the first device created the DIR 112 and issues any identity tokens created by use of the DIR 112), the DIR 112 will contain an internal pointer to identity provider 107. This is in contrast to a "managed DIR" which contains an address for a third-party identity provider, such as identity provider 115. Identity provider 107 may include a claims transformer and claims authority as described in relation to identity provider 115.

In the case of a DIR 112 that has been "self-issued" by first device 105, when second device 111 requests the DIR 112 from first device 105, first device changes the address of the identity provider 107 from an internal address to an externally accessible address. This allows second device 111, when it eventually attempts to use the DIR 112 to obtain an identity token 150, to find identity provider 107. For example, if the request for DIR 112 from second device 111 was made via Bluetooth communication, the address for identity provider 107 may be changed to a Bluetooth identifier. If the connection between second device and first device is made via GPRS, a phone number for identity provider 107 may be inserted into DIR 112. Similarly IP address and port number, a URL path name, or any number of other addressing mechanisms may be used depending on the available communication stack(s) between first device 105 and second device 111. Similarly, if a self-issued DIR 112 is accessed from third device 117, third device 117 may make similar changes to provide an externally accessible address for an identity provider included in third device 117.

In embodiments, DIRs 112 may include use restrictions. For example, DIR 112 may be programmed to include instructions that, once DIR 112 is released (such as to second device 111), it may be used only one time or only within the "next ten minutes." As discussed, on occasion, the principal 110 may be interacting with relying party 120 via a second device 111 that is not secure (e.g., public library, kiosk, etc.). Accordingly, although embodiments may otherwise protect against unauthorized use of DIRs 112 (e.g., password protection, etc.), use limitations provide another layer of protection against unauthorized use after the principal 110 is no longer in control of second device 111.

In embodiments, first device 105 and third device 117 may have different computing abilities compared to each other and to second device 111. For example, one or both of first device 105 and third device 117 may lack an internal clock or other independent sense of time. This makes it difficult for first device 105 or third device 117 to encode any use restrictions into DIR 112 before releasing it to second device 111. In embodiments, second device 111 includes in its request for a DIR 112 a timestamp based on the timing mechanism of second device 111. In the absence of its own timing mechanism(s), first device 105 or third device 117 may rely on the timestamp in the request from second device 111 to encode any time-based use restrictions into DIR 112 before releasing it to second device 111. For example, if the DIR 112 requires, or principal 110 requests, a restriction that DIR 112 will be useable for only 10 minutes after it is downloaded to second device 111, first device 105 uses a timestamp in the request from second device 111 to determine the current time, adds ten minutes to it, and sets the appropriate expiration time in the copy of DIR 112 sent to second device 111.

Figure 2:
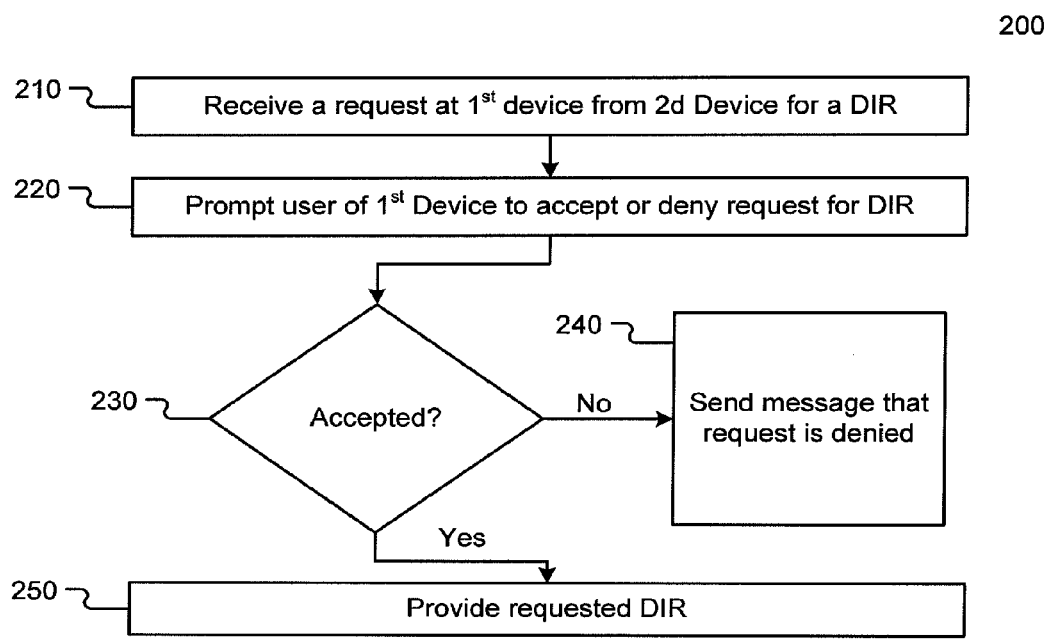
FIG. 2 illustrates an example method for controlling distribution of DIRs.

FIG. 2 illustrates an embodiment of a method 200 for controlling distribution of DIRs. Method 200 could occur in response to a principal attempting to access a relying party or outside of any particular context of an attempt to use a DIR. At step 210, a request to procure a DIR is received at a first device from a second device. A user of the first device is prompted 220 to accept or deny the request for the DIR. In embodiments, the user of the first device is prompted through a user-interface of the first device. The user of the first device may be asked to authenticate himself/herself prior to being permitted to accept or deny the request for DIR. Authentication methods may include any of a variety of authentication protocols, including passwords, biometrics, smartcards, etc.

At step 230, the user of the first device indicates to the first device whether the request has been accepted. The indication of acceptance can be made in a variety of manners, including a keyboard entry at the first device in response to a prompt. If the request for DIR is not accepted, then a message is sent 240 that the request is denied. For example, if the user of the first device denies the request, or the request times out, the first device may send a message that the second device may display to a user of the second device. As discussed, the user of the first device may be the same as or different from the user of the second device. If the request for DIR is accepted, the requested DIR is provided 250.

Figure 3:
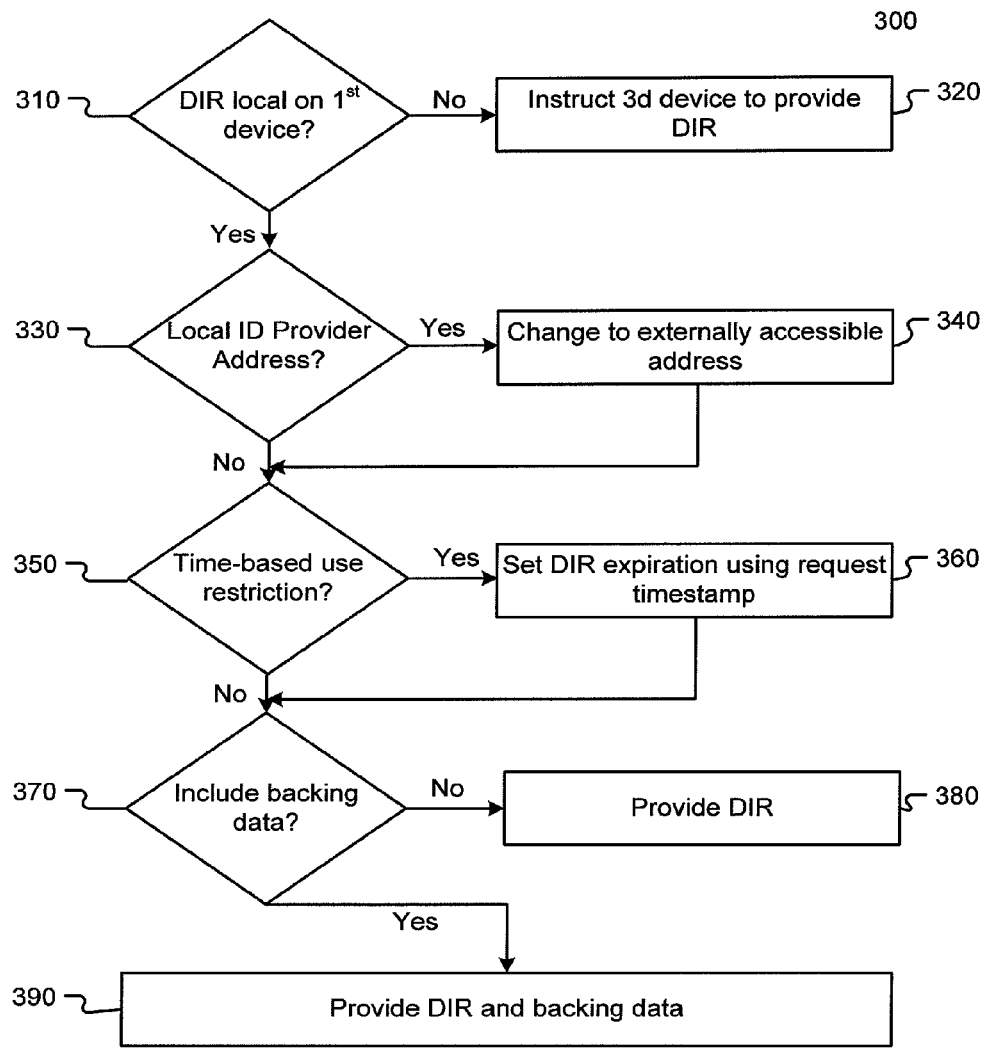
FIG. 3 illustrates an example method for providing a DIR.

FIG. 3 illustrates a method 300 that, in some embodiments, comprises provide step 250. At step 310, a determination is made whether the requested DIR is stored locally on the first device. If not, a third device is instructed 320 to provide the requested DIR. In this embodiment, the third device may perform any or all of the remaining steps of this FIG. 3.

At step 330, if the DIR is stored locally, a determination is made whether the identity provider address included in the requested DIR points to a local service or process. If so, the identity provider address in the copy of the DIR to be provided is changed 340 to an externally accessible address. As discussed in relation to FIG. 1, the choice of an externally accessible identity provider address may be dependent upon the type of communication stack used to request the DIR. For example if the second device used an internet connection to request the DIR from the first device, the address for the identity provider local to the first device may be changed to a URL address accessible by the second device.

At step 350, a determination is made whether a time-based use restriction is to be included in the DIR. In embodiments, the DIR will contain instructions that, if transferred to another device, that copy of the DIR must be restricted in use (e.g., "good for ten minutes," "one-time use," etc.). In other embodiments, a principal at the second device may include a use restriction in his/her request for the DIR. For example, a principal that is using a public computer to access a relying party may request that a DIR from his/her mobile phone be downloaded to the public computer. The principal may also request, however, that the DIR be good for only ten minutes, which will enable the principal to complete an operation at the relying party, but the DIR will not be useable by someone who later logs into the public computer. When the first device includes a use restriction in a DIR, it relies in good faith on the second device honoring the use restriction. For example, an "identity selector" or other user interface at the second device may be programmed to present to a user only cards that have not expired or otherwise become unusable according to a use restriction.

If a time-based use restriction is to be included in the DIR copy provided to the second device, the device providing the DIR may program the use restriction using an internal clock. In the embodiment illustrated in FIG. 3, the device (e.g., the first device) lacks an internal timing mechanism and sets 360 the use restriction based off of a timestamp in the request from the second device in the manner discussed above.

At step 370, a determination is made whether to include the data backing the requested DIR. Whether to include backing data may be determined based on the request from the principal or otherwise. Backing data includes the actual data that comprise the claims required by a relying party. For example, a DIR may include metadata that lists the types of claims required to be included in an identity token for a particular relying party (e.g., fields for social security number, phone number, etc.). Backing data comprises the actual social security number, phone number, etc. that would be encoded by an identity provider into an identity token in response to receiving the DIR.

Typically, backing data is not provided along with a DIR because backing data is sensitive personal information, and DIRs are used to represent the backing data that is available in a secure identity token from an identity provider. This protects the backing data from being stored or transferred unnecessarily. However, in embodiments, the first device may lack the computational ability to produce or encrypt an identity token, and the principal may desire to transfer both a DIR and its backing data to a second device that is capable of acting as an identity provider (provider of a necessary identity token).

If backing data is not to be included with the DIR, the DIR is provided 380. In embodiments, step 380 includes sending the DIR from the first device to the second device. In other embodiments, step 380 includes directing a third device to send the DIR to the second device or providing the second device with a pointer or reference to the DIR stored on a third device. If backing data is to be included with the DIR, the DIR and backing data are similarly provided 390.

Figure 4:
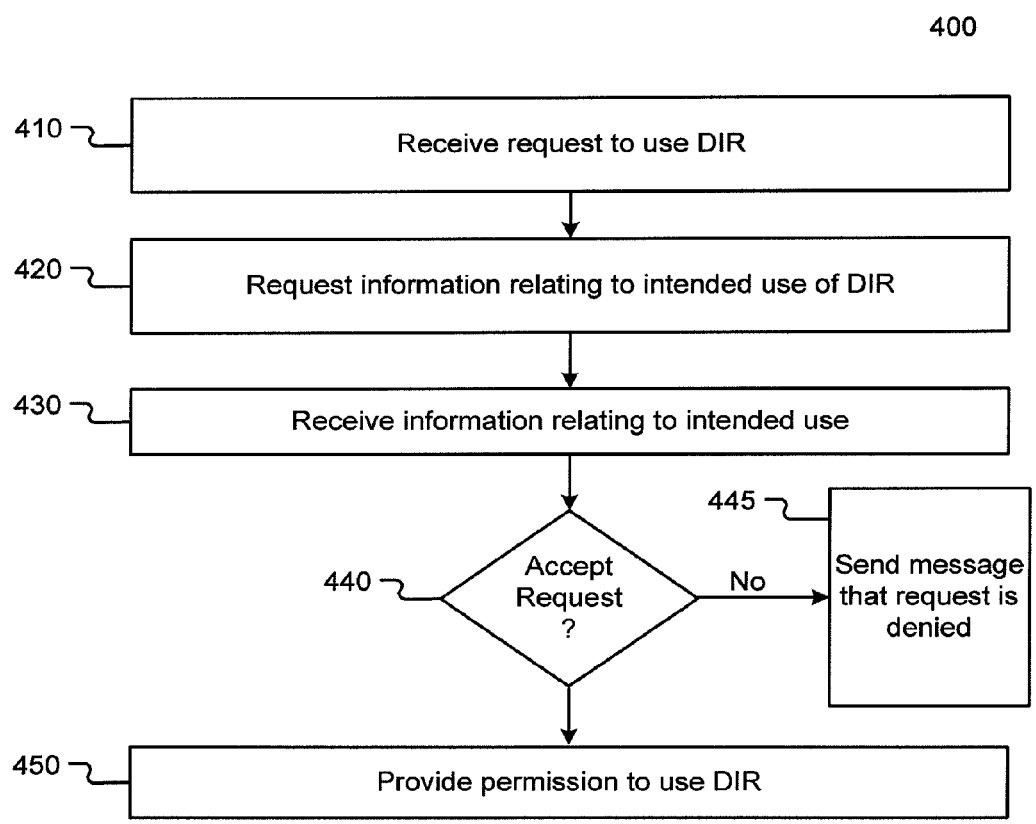
FIG. 4 illustrates an example method for controlling use of a DIR.

FIG. 4 illustrates a method 400 of controlling use of a DIR. At step 410, a request to use a DIR is received. In embodiments a user of a first device receives the request to use a DIR. The user of the first device may be different from or the same as the user of the device making the request. For example, a child may be required to get permission from a parent to use the DIR to perform particular operations at a relying party. The request to use the DIR may be from a device controlled by a principal or from an identity provider that received the DIR in an attempt to obtain an identity token.

The DIR may be programmed to require a device attempting to send the DIR to an identity provider to first obtain permission from a particular person or device. For example, the device being used by the principal to interact with the relying party could be required to ask permission to use the DIR prior to sending the DIR to an identity provider. The DIR could also be programmed to signal to an identity provider receiving the DIR that permission to use the DIR must be obtained from a particular person or device before the identity provider is permitted to provide the requesting device with an identity token. The request for permission could include first authenticating the user targeted to give permission (through password, biometrics, or otherwise) or may require only an indication of acceptance from whoever is then controlling the device to which the request for permission is sent.

In embodiments, a user of the device receiving a request to use a DIR (to obtain an identity token) may request 420 information relating to the intended use of the DIR. For example, a user being asked to approve the request to use the DIR may desire to know the name of the relying party at which a principal is attempting to perform an operation, what the requested operation is, and other information relating to the operation. At step 430, the information is received relating to the intended use of the DIR. As a nonexclusive example, the information may include the name of an on-line merchant (relying party), an attempted purchase (operation), and the price/cost of the intended transaction (operation-specific parameters). The information may also include a descriptive name for the DIR (e.g., "Mom's Visa Card"). This information may aid the user to determine 440 whether to accept the request. If not, a message denying the request is provided 445. If so, permission to use the DIR is provided 450. Denial of the request at step 445 or permission for the request at step 450 may be provided to the requesting device or to an identity provider (either directly or through the requesting device).

Figure 5:
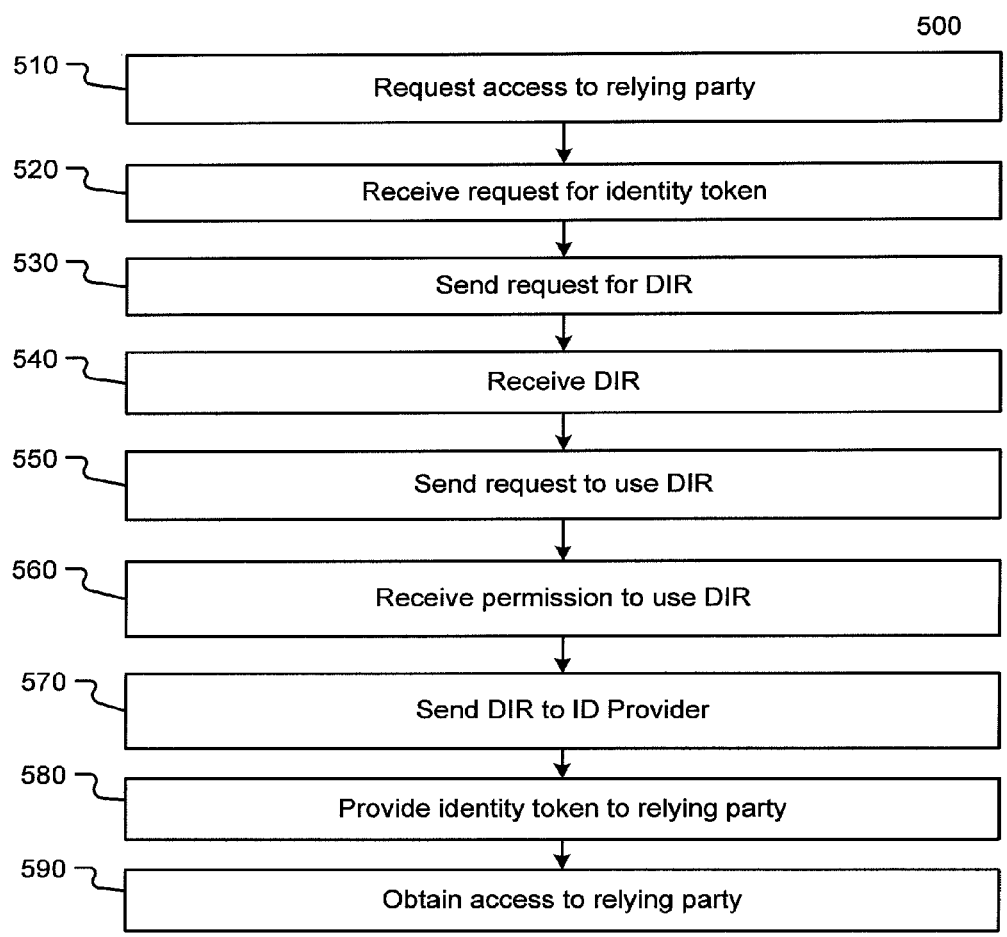
FIG. 5 illustrates an example method for procuring and using a DIR.

FIG. 5 depicts a method 500 for obtaining and using a DIR. In this embodiment, the method begins with a request 510 to access a relying party. The request to access may be a request to enter a secured area of relying party (such as a secured web page) or a request to perform a particular operation at the relying party. At step 520, a request for an identity token is received. For example, the relying party may respond to a device that requested access to the relying party with the security policy for the relying party, including a request for an identity token that includes a minimum set of claims.

At step 530, a request for a DIR is made. The request for DIR, in embodiments, may be a request for a specific DIR or for any DIRs that meet the minimum set of claims required by the security policy of the relying party. The DIR is received at step 540, and a request to use the DIR is sent at step 550. The request to use the DIR at step 550 can be made to a different device or entity than the request to obtain the DIR. For example, a principal may store DIRs on his/her mobile phone and request that a DIR be downloaded for use to a public PC. The DIR may, however, be programmed to require the permission of another person or user of another device before it can be used to obtain an identity token.

At step 560, permission to use the DIR is received. In the embodiment illustrated in FIG. 5, permission to use the DIR is received 560 before the DIR is sent at step 570 to an identity provider. In other embodiments, the DIR is sent to an identity provider, and the identity provider requests and receives permission to use the DIR prior to providing an identity token. At step 580, the identity token is provided to the relying party. In embodiments, the identity token is provided directly to the relying party by the identity provider. In other embodiments, the identity token is provided to the device requesting access to the relying party, which forwards the identity token to the relying party. In addition, as used herein, "provide identity token" includes providing a pointer or reference to an identity token that the relying party can use to obtain the identity token from the identity provider or other device. In embodiments, the communication path between the identity provider and the relying party may be more reliable or robust than the path through the requesting device to the relying party.

In addition, in embodiments the requests to obtain and use the DIR may be made simultaneously to a single device. For example, if a principal seeks to obtain access to a relying party and sends a request to obtain and use a DIR to a first device, the first device may prompt a user whether the request to obtain the DIR and the request to use the DIR are accepted. If so, and the DIR is self-issued, the first device may respond to the device being used by the principal with an identity token that meets the security policy of the relying party. In other embodiments, this is not applicable because different users or devices will be involved in the determination whether to release the DIR versus whether the DIR can be used to obtain an identity token.

At step 590, access to the relying party is obtained. For example, if an identity token is provided at step 580 meeting the security policy of the relying party, the principal is permitted to perform a requested operation at the relying party.

Figure 6:
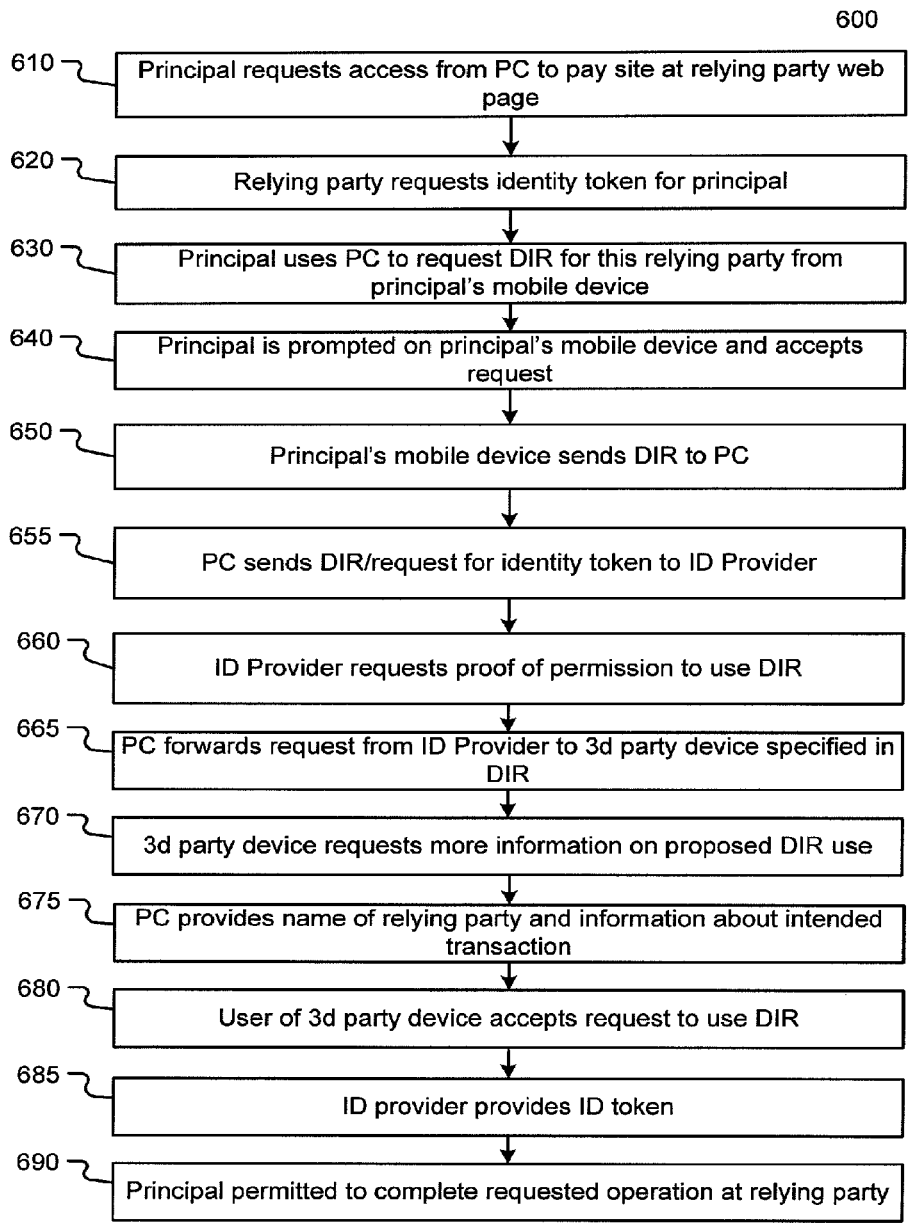
FIG. 6 illustrates another example method for procuring and using a DIR. [00

FIG. 6 illustrates an embodiment of a method 600 in which a DIR is obtained and used in a particular context. At step 610, a principal requests access from a PC to a payment site at a relying party web site. At step 620, the relying party requests an identity token having a minimum set of claims relating to the principal. The principal uses 630 the PC to request a DIR for this relying party that the principal has stored on the principal's mobile device. The principal is prompted 640 on the principal's mobile device regarding the request for the DIR, and the principal accepts the request. The principal's mobile device then sends 650 the requested DIR to the PC then being used by the principal.

At step 655, the PC sends the DIR to an identity provider specified in the DIR. In this example embodiment, the identity provider is a third-party identity provider, and the DIR is a "managed DIR." The identity provider requests 660 proof from the principal of permission to use the DIR to obtain an identity token. The PC forwards 665 the request for proof of permission to use to a third party device specified in the DIR. In this exemplary embodiment, the principal is a teenager, and the DIR directs the identity provider to seek permission from the principal's mother on her cellular phone. The principal's mother uses her cellular phone to request 670 more information regarding the intended use of the DIR.

At step 675, the PC provides the requested information to the third party device controlled by the principal's mother. In this example, the PC provides the name of the relying party, the anticipated operation (e.g., payment for goods), and operation-specific parameters (e.g., the price of the goods). At step 680, the principal's mother uses her cell phone to accept the request to use the DIR, and sends a message to that effect to the identity provider through the PC. The identity provider then provides 685 the identity token to the relying party, and the principal is permitted 690 to complete the requested operation at the relying party.

Figure 7:
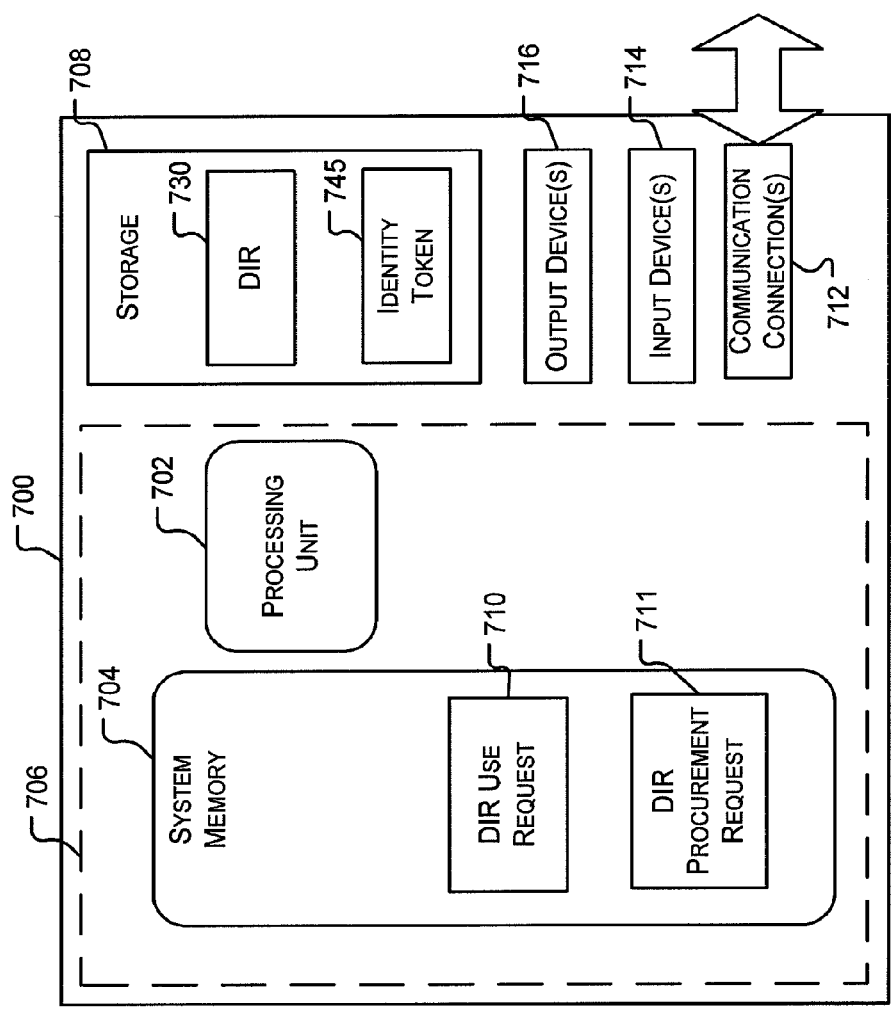
FIG. 7 illustrates a computing device configuration according to an embodiment of the disclosure.

FIG. 7 illustrates a general computing device 700 (also referred to herein as a device, computer or computer system), which can be used to implement the embodiments described herein. The computing device 700 is only one example of a computing environment and is not intended to suggest any limitation as to the scope of use or functionality of the computer and network architectures. Neither should the computing device 700 be interpreted as having any dependency or requirement relating to any one or combination of components illustrated in the example computing device 700. In embodiments, computing device 700 may be used, for example, as a first device 105, second device 111, third device 117, identity provider 115, or relying party 120 as described above with respect to FIG. 1.

In its most basic configuration, computing device 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. System memory 704 stores applications that are executing on computing device 700. In addition to applications, memory 704 may also store information being used in operations being performed by computing device 700, such as a DIR use request 710 and/or a DIR procurement request 711, as described with respect to FIGS. 1-6.

Additionally, computing device 700 may also have additional features/functionality. For example, computing device 700 may also include additional storage 708 (removable and/or non-removable) including, but not limited to, magnetic or optical disks or tape. Such additional storage is illustrated in FIG. 7 by storage 708. Computer storage media includes volatile and nonvolatile, removable and non-removable media implemented in any method or technology for storage of information such as computer readable instructions, data structures, program modules or other data. Memory 704 and storage 708 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

As those with skill in the art will appreciate, storage 708 may store a variety of information. Among other types of information, storage 708 may store a digital identity representation 730 or an identity token 745.

Computing device 700 may also contain communications connection(s) 712 that allow the system to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing device 700 may also have input device(s) 714 such as keyboard, mouse, pen, voice input device, touch input device, etc. Output device(s) 716 such as a display, speakers, printer, etc. may also be included. All these devices are well know in the art and need not be discussed at length here.

The various embodiments described above are provided by way of illustration only and should not be construed to limiting. Those skilled in the art will readily recognize various modifications and changes that may be made to the embodiments described above without departing from the true spirit and scope of the disclosure or the following claims.

We claim:

1. A method of using a digital identity representation, comprising:
   sending, from a second device, a request to a relying party for authentication requirements of the relying party;
   sending to a first device a request from the second device to obtain the digital identity representation based on the authentication requirements of the relying party;
   receiving at the second device the digital identity representation, the digital identity representation including metadata describing at least a first claim about a principal;
   sending from the second device a request to use the digital identity representation;
   receiving at the second device permission to use the digital identity representation;
   using the digital identity representation to request an identity token;
   receiving the identity token; and
   providing the identity token to the relying party.

2. The method of claim 1, wherein the request to use the digital identity representation is sent to a third device that is different from the first and second devices.

3. The method of claim 1, wherein the request to use the digital identity representation is sent to a device that is controlled by a person other than the principal.

4. The method of claim 1, wherein the request to use the digital identity information includes information identifying the relying party.

5. A system for using a digital identity representation, comprising:
   at least one processor;
   memory, operatively connected to the at least one processor and including instructions that, when executed by the at least one processor, cause the at least one processor to:
      send, from a second device, a request to a relying party for authentication requirements of the relying party;
      send to a first device a request from the second device to obtain the digital identity representation based on the authentication requirements of the relying party;
      receive at the second device the digital identity representation, wherein the digital identity representation includes metadata describing at least a first claim about a principal;
      send from the second device a request to use the digital identity representation;
      receive at the second device permission to use the digital identity representation;
      use the digital identity representation to request an identity token;
      receive the identity token; and
      provide the identity token to the relying party.

6. The system of claim 5, wherein the request to use the digital identity representation is sent to a third device that is different from the first and second devices.

7. The system of claim 5, wherein the request to use the digital identity representation is sent to a device that is controlled by a person other than the principal.

8. The system of claim 5, wherein the request to use the digital identity information includes information identifying the relying party.

9. The system of claim 5, wherein the digital identity representation is programmed to signal to an identity provider receiving the digital identity representation that permission to use the digital identity representation must be obtained from a particular person before the identity provider is permitted to provide the requesting device with an identity token.

10. The system of claim 5, wherein the digital identity representation is programmed to signal to an identity provider receiving the digital identity representation that permission to use the digital identity representation must be obtained from a particular device before the identity provider is permitted to provide the requesting device with an identity token.

11. The system of claim 5, wherein the request for permission to use the digital identity representation requires an indication of acceptance from a person controlling the device to which the request for permission is sent.

12. The system of claim 5, wherein permission to use the digital identity representation is contingent upon providing information regarding the intended use of the digital identity representation.

13. The system of claim 12, wherein the information regarding the intended use of the digital identity representation comprises the name of the relying party.

14. The system of claim 5, wherein permission to use the digital identity representation is received before the digital identity representation is sent to an identity provider.

15. The system of claim 5, wherein the digital identity representation is sent to an identity provider, and the identity provider requests and receives permission to use the digital identity representation prior to providing the identity token.

16. The system of claim 5, wherein receiving the identity token comprises receiving a pointer to the identity token that the relying party can use to obtain the identity token from another device.

17. The system of claim 5, wherein the request to obtain and use the digital identity representation are made simultaneously to a single device.

18. The method of claim 1, wherein the digital identity representation is sent to an identity provider, and the identity provider requests and receives permission to use the digital identity representation prior to providing the identity token.

19. The system of claim 1, wherein the digital identity representation is programmed to signal to an identity provider receiving the digital identity representation that permission to use the digital identity representation must be obtained from a particular device before the identity provider is permitted to provide the requesting device with an identity token.

20. The system of claim 1, wherein the digital identity representation is programmed to signal to an identity provider receiving the digital identity representation that permission to use the digital identity representation must be obtained from a particular person before the identity provider is permitted to provide the requesting device with an identity token.

* * * * *